D. C. KUFFEL.
SAFETY COUPLING HOOK.
APPLICATION FILED MAY 20, 1918.

1,293,126.

Patented Feb. 4, 1919.

Inventor:
David Clyde Kuffel,
by Hazard & Miller
Att'ys.

UNITED STATES PATENT OFFICE.

DAVID CLYDE KUFFEL, OF RANDSBURG, CALIFORNIA, ASSIGNOR OF ONE-HALF TO VALDEMAR SCHMIDT, OF LOS ANGELES, CALIFORNIA.

SAFETY COUPLING-HOOK.

1,293,126.      Specification of Letters Patent.      Patented Feb. 4, 1919.

Application filed May 20, 1918. Serial No. 235,719.

*To all whom it may concern:*

Be it known that I, DAVID CLYDE KUFFEL, a citizen of the United States, residing at Randsburg, in the county of Kern and State of California, have invented new and useful Improvements in Safety Coupling-Hooks, of which the following is a specification.

My object is to make a safety coupling hook for attaching buckets and the like to hoisting cables, and my invention consists in the novel feature herein shown, described and claimed.

Figure 1:
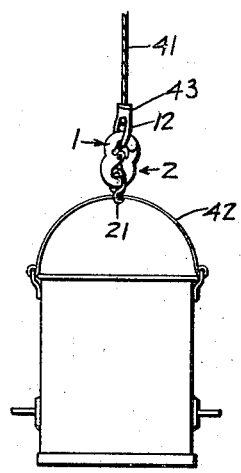
Figure 1 is an elevation showing a bucket attached to a hoisting cable by means of a safety coupling hook embodying the principles of my invention.

The safety coupling hook consists of the primary hook member 1 and the secondary hook member 2.

The primary hook member 1 is preferably cast in one piece and is to be made strong enough to lift the load and do all the hard work. The details of the primary hook member 1 are as follows: There is an upper hook 3, a lower hook 4, and a central bearing 5. The upper face 6 of the upper hook 3 is a semi-circle in side elevation or in sectional elevation, and the lower face 7 of the lower hook 4 is likewise a semi-circle in side elevation or sectional elevation, and the faces 6 and 7 are rounded in cross-section or in edge elevation. A passage 8 leads from the point 9 of the hook 3 upwardly and inwardly, at an angle of about forty-five degrees, to the bearing point 10, and then the passage 11 leads inwardly and downwardly at an angle of about forty-five degrees to a vertical line and at right angles to the passage 8. The passages 8 and 11 and the bearing point 10 are just large enough to easily receive the ring 12. The outer side 13 of the passage 8 leads from the point 9 and the inner side 14 is one outer face of the bearing 5. The outer side 15 of the passage 11 is the inner face of the hook 3 and the inner face 16 of the passage 11 as an outer face of the bearing 5 at right angles to the outer face 14. Another outer face 17 of the bearing 5 is parallel with the face 16 and the bearing opening 18 is transverse and central relative to the faces 14. 16 and 17. The hook 4 has a point 19 and a bearing 20, the bearing 20 being inside of and slightly below the point 19. The bearing 20 is in vertical alinement with the bearing opening 18 and with the bearing 10 when the hook is in operation. The bearing 20 is adapted to receive the ring 21. In casting the primary hook member 1 a slot 22 is formed at its transverse center and extending from one edge so as to split the point 9 of the hook 3 into two parts, split the bearing 5 into two parts, and split the point 19 of the hook 4 into two parts. The upper boundary 23 of the slot 22 and the lower boundary 24 are substantially concentric to the bearing opening 18.

The details of the secondary hook member 2 are as follows: The member is cut or stamped from sheet metal and is thick enough to fit loosely in the slot 22. The finished member consists of an upper hook 25, a lower hook 26, and a central bearing 27. A slot 28 passes between the point 29 of the hook 25 and the bearing 27 and said slot 28 extends under the hook 25 around to the end 30, said end 30 being on a level with the bearing opening 31 and there being a point 32 extending from the bearing 27 above the end 30 to restrict the passage. The bearing point 33 of the slot 28 is in vertical alinement with the bearing opening 31. A slot 34 extends inwardly and downwardly past the point 35 of the hook 26 to the bearing point 36, said bearing point 36 being in line with the opening 31 and the bearing point 33. The secondary hook member 2 is similar in form to the primary hook member 1 and fits in the slot 22, there being a pivot pin 37 inserted through the bearing opening 31 and through the bearing opening 18, said pin 37 being loose in the opening 31 so that the secondary hook member will rotate freely upon the pin. The outer face 38 of the secondary member spans the gap between the points 9 and 19 when the parts are assembled and in use.

Figure 3:
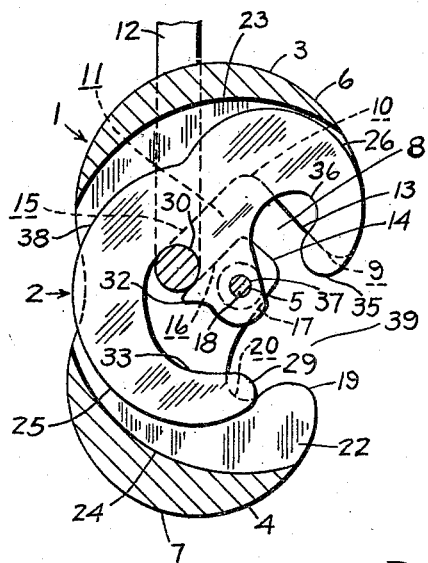
Fig. 3 is a sectional elevation on a plane parallel with Fig. 2 and showing the movement of the parts.
Figure 4:
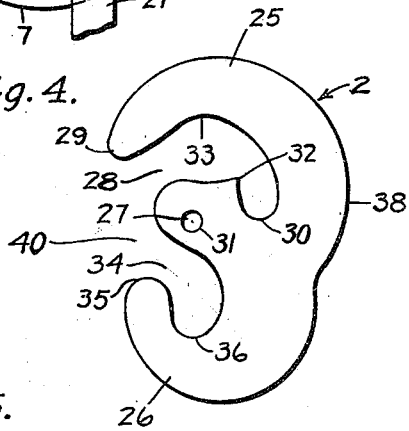
Fig. 4 is a side elevation of the secondary hook member removed from the primary hook member, and the secondary hook member being shown in the same position as in Fig. 2.
Figure 5:
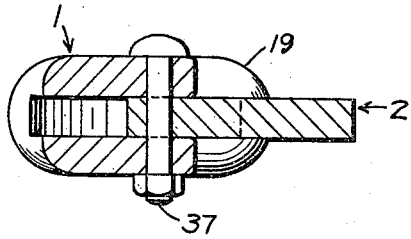
Fig. 5 is a cross-section on the line 5—5 of Fig. 2.

When it is desired to apply the ring 12 the secondary member 2 is rotated until it is bottom end up. This will bring the point 29 near to the point 19. Then the ring 12 will pass through the gap 39 between the points 9 and 19. Then the secondary hook member 2 is rotated to carry the point 29 past the gap 39 with the ring 12 in the slot 28, and continued rotation of the secondary hook member will carry the ring 12 through the slots 8 and 11 to the end of the slot 11, as shown in Fig. 3. Then the ring 21 will pass through the gap 39 between the points 9 and 19 and through the gap 40 between the points 29 and 35. Then the secondary hook member 2 is rotated backwardly until the ring 21 passes into the bearing 20 and the point 35 passes below the ring to bring the bearing point 36 into line with the bearing 20, and then when the hoisting cable 41 is drawn taut the ring 12 will pull upwardly in the bearings 10 and 33 and the ring 21 will pull downwardly in the bearings 20 and 36 and the coupling is made and ready for operation.

The ring 21 may be formed as an integral part of the bail 42, as shown in Fig. 1, or it may be any other form of ring for carrying the load. The ring 12 is connected to the cable 41 by a swivel 43.

Figure 2:
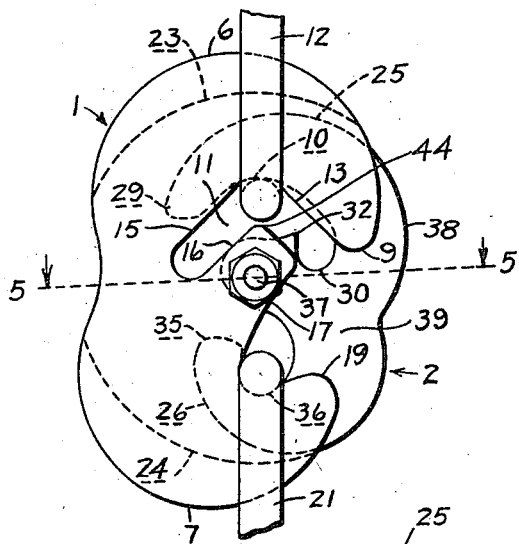
Fig. 2 is a side elevation upon an enlarged scale, showing the safety coupling hook with the parts in position as when connecting two rings together, the rings being broken away.

The primary hook member 1 and the secondary hook member 2 are assembled with their gaps 39 and 40 facing each other when the parts are in coupled positions, as in Fig. 2, and these gaps open the same way when the parts are being assembled or disassembled, as in Fig. 3.

When the parts are in coupled position, as in Fig. 2, the ring 12 fits easily between the point 44 at the junction of the faces 14 and 16, and the bearing point 10, and if the cable slacks, the point 32 obstructs the passage 8 to prevent the ring 12 from moving in that direction to turn the secondary hook member 2 over. The outer face 38 of the secondary hook member 2 is rounded and smooth so that when the coupling is being dragged it will not catch, and the face 38 extends outwardly beyond the points 9 and 19 and joins with the faces 6 and 7 to make a continuous shoe or runner-like surface.

Various changes may be made without departing from the spirit of my invention as claimed.

I claim:

1. A safety coupling hook comprising a primary hook member and a secondary hook member; the primary hook member comprising an upper hook, a lower hook, and a central bearing, the upper and lower hooks being turned upwardly and downwardly in the same vertical plane and there being a gap between the points of the upper and lower hooks, the bearing opening being transverse of the plane of the hooks and there being a channel transverse of the bearing opening; the secondary hook member comprising an upper hook, a lower hook, and a central bearing, the upper and lower hooks being turned upwardly and downwardly in the same vertical plane and there being a gap between the points of the upper and lower hooks; the secondary hook member being turned with its gap facing the gap in the primary hook member when in coupling position and being inserted into the channel; and a pivot pin through the bearings so that the secondary hook member may rotate upon the pivot pin.

2. The combination with a supporting ring and a bail ring, of a safety coupling hook comprising a primary hook member and a secondary hook member; the primary hook member comprising, an upper hook to engage the supporting ring, a lower hook to engage the bail ring, and a central bearing, the upper and lower hooks being turned upwardly and downwardly in the same vertical plane and there being a gap between the points of the upper and lower hooks through which the supporting ring and the bail ring are inserted, the bearing opening being transverse of the plane of the hooks and there being a channel transverse of the bearing opening, and there being a point extending upwardly from the bearing toward the supporting ring; the secondary hook member comprising, an upper hook and a lower hook and a central bearing, the upper and lower hooks being turned upwardly and downwardly in the same vertical plane and there being a gap between the points of the upper and lower hooks to allow the supporting ring and bail ring to pass; the secondary hook member being turned with its gap facing the gap in the primary hook member when in coupling position, and the secondary hook member being inserted into the channel, and there being a point extending upwardly and outwardly from the central bearing to engage the supporting ring; and a pivot pin inserted through the bearings so that the secondary hook member may rotate in the channel upon the pivot pin.

In testimony whereof I have signed my name to this specification.

DAVID CLYDE KUFFEL.